(12) United States Patent
Nishi

(10) Patent No.: US 8,780,124 B2
(45) Date of Patent: Jul. 15, 2014

(54) GRAPHIC PROCESSING APPARATUS AND COMPUTER-READABLE MEDIUM STORING GRAPHIC PROCESSING PROGRAM

(75) Inventor: Hidefumi Nishi, Yokohama (JP)

(73) Assignee: Fujitsu Semiconductor Limited, Yokohama (JP)

( * ) Notice: Subject to any disclaimer, the term of this patent is extended or adjusted under 35 U.S.C. 154(b) by 226 days.

(21) Appl. No.: 13/170,404

(22) Filed: Jun. 28, 2011

(65) Prior Publication Data

US 2012/0062578 A1 Mar. 15, 2012

(30) Foreign Application Priority Data

Sep. 15, 2010 (JP) ................................. 2010-206860

(51) Int. Cl.
*G06T 15/40* (2011.01)
*G06T 1/00* (2006.01)
*G06F 12/02* (2006.01)
*G09G 5/00* (2006.01)

(52) U.S. Cl.
CPC ...................................... *G06G 5/363* (2013.01)
USPC ............ 345/544; 345/422; 345/522; 345/582

(58) Field of Classification Search
USPC ........................................................ 345/544
See application file for complete search history.

(56) References Cited

U.S. PATENT DOCUMENTS

| | | | |
|---|---|---|---|
| 5,808,617 A | 9/1998 | Kenworthy et al. | |
| 5,852,443 A | 12/1998 | Kenworthy | |
| 5,864,342 A | 1/1999 | Kajiya et al. | |
| 5,867,166 A | 2/1999 | Myhrvold et al. | |
| 5,870,097 A | 2/1999 | Snyder et al. | |
| 5,880,737 A | 3/1999 | Griffin et al. | |
| 5,886,701 A | 3/1999 | Chauvin et al. | |
| 5,949,428 A | 9/1999 | Toelle et al. | |
| 5,977,977 A | 11/1999 | Kajiya et al. | |
| 5,990,904 A | 11/1999 | Griffin | |
| 5,999,189 A | 12/1999 | Kajiya et al. | |

(Continued)

FOREIGN PATENT DOCUMENTS

| | | |
|---|---|---|
| JP | 2002-529865 | 9/2002 |
| JP | 2004-102998 | 4/2004 |

OTHER PUBLICATIONS

Coppen, Derek et al., "A Distributed Frame Buffer for Rapid Dynamic Changes to 3D Scenes", Computers and Graphics, vol. 19, No. 2 pp. 247-250, Mar. 1995.

(Continued)

*Primary Examiner* — Ke Xiao
*Assistant Examiner* — F. M. Hossain
(74) *Attorney, Agent, or Firm* — Fujitsu Patent Center

(57) ABSTRACT

A graphic processing apparatus includes a chunk assignment unit which assigns a block in which a maximum N number of polygons are located, out of a plurality of polygons drawn in a frame buffer which is divided into a plurality of blocks, to a maximum M number of chunk buffers; a chunk generation unit which generates pixel data of a polygon located in a block assigned to the chunk buffer, out of the N number of polygons, and writes the pixel data to the chunk buffer; and a chunk writing unit which writes the pixel data written in the chunk buffer to the frame buffer, wherein a processing phase, including processing by the chunk assignment unit, processing by the chunk generation unit, and processing by the chunk writing unit, is repeatedly executed for the plurality of polygons.

18 Claims, 15 Drawing Sheets

(56) References Cited

U.S. PATENT DOCUMENTS

| | | | |
|---|---|---|---|
| 6,005,582 | A | 12/1999 | Gabriel et al. |
| 6,008,820 | A | 12/1999 | Chauvin et al. |
| 6,016,150 | A | 1/2000 | Lengyel et al. |
| 6,064,393 | A | 5/2000 | Lengyel et al. |
| 6,252,608 | B1 | 6/2001 | Snyder et al. |
| 6,292,194 | B1 | 9/2001 | Powell, III |
| 6,326,964 | B1 * | 12/2001 | Snyder et al. ............... 345/419 |
| 6,366,289 | B1 * | 4/2002 | Johns ............................ 345/543 |
| 6,750,867 | B1 | 6/2004 | Gibson |
| 7,194,033 | B2 * | 3/2007 | Yourlo .................... 375/240.12 |
| 2004/0212619 | A1 * | 10/2004 | Saito et al. .................... 345/441 |

OTHER PUBLICATIONS

Kawai, Toshiyuki et al., "Evaluation of Parallel Ray Tracing Algorithm Using Screen Space Subdivison for Image Generation System Magg", Systems and Computers in Japan, vol. 15, No. 11, pp. 78-86, Oct. 1994.

* cited by examiner

FIG.5

PB10 POLYGON PARAMETER BUFFER

| IDENTIFICATION INFORMATION | PARAMETER | FLAG |
|---|---|---|
| ENTRY 1 | VERTEX PARAMETERS AND DRAWING PARAMETERS OF PG1 | NOT COMPLETE |
| ENTRY 2 | VERTEX PARAMETERS AND DRAWING PARAMETERS OF PG2 | NOT COMPLETE |
| ENTRY 3 | VERTEX PARAMETERS AND DRAWING PARAMETERS OF PG3 | NOT COMPLETE |
| ENTRY 4 | VERTEX PARAMETERS AND DRAWING PARAMETERS OF PG4 | NOT COMPLETE |

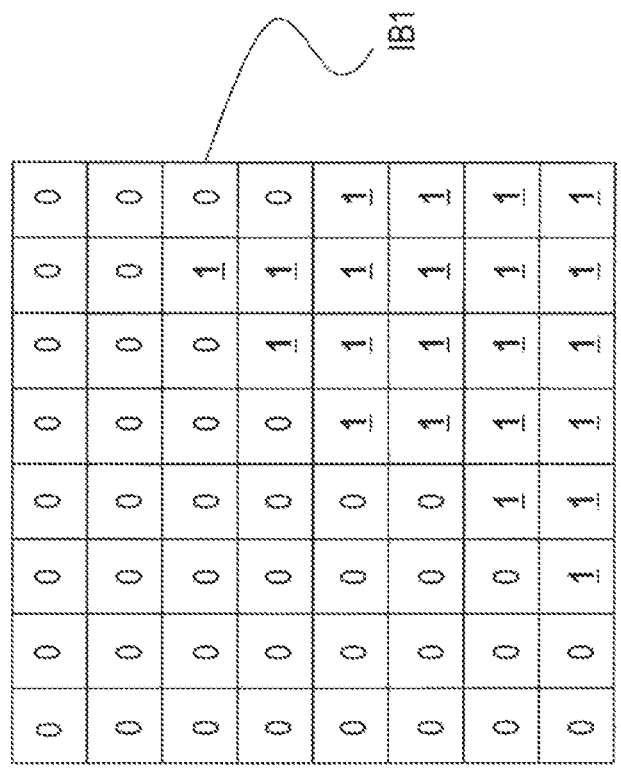
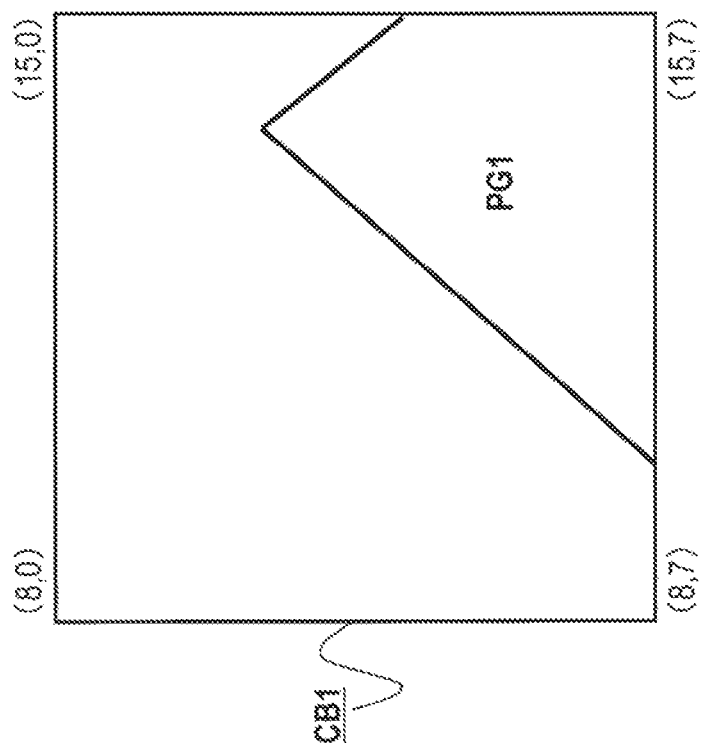
FIG.11

FIG. 13

PB20 POLYGON PARAMETER BUFFER

| IDENTIFICATION INFORMATION | PARAMETER | FLAG |
|---|---|---|
| ENTRY 1 | VERTEX PARAMETERS AND DRAWING PARAMETERS OF PG5 | NOT COMPLETE |
| ENTRY 2 | VERTEX PARAMETERS AND DRAWING PARAMETERS OF PG6 | NOT COMPLETE |
| ENTRY 3 | VERTEX PARAMETERS AND DRAWING PARAMETERS OF PG7 | NOT COMPLETE |
| ENTRY 4 | VERTEX PARAMETERS AND DRAWING PARAMETERS OF PG8 | NOT COMPLETE |

PB21 POLYGON PARAMETER BUFFER

| IDENTIFICATION INFORMATION | PARAMETER | FLAG |
|---|---|---|
| ENTRY 1 | VERTEX PARAMETERS AND DRAWING PARAMETERS OF PG5 | COMPLETE |
| ENTRY 2 | VERTEX PARAMETERS, DRAWING PARAMETERS AND COORDINATES OF PG6 | NOT COMPLETE |
| ENTRY 3 | VERTEX PARAMETERS AND DRAWING PARAMETERS OF PG7 | COMPLETE |
| ENTRY 4 | VERTEX PARAMETERS AND DRAWING PARAMETERS OF PG8 | NOT COMPLETE |

PB30 POLYGON PARAMETER BUFFER

| IDENTIFICATION INFORMATION | PARAMETER | FLAG |
|---|---|---|
| ENTRY 1 | VERTEX PARAMETERS AND DRAWING PARAMETERS OF PG9 | NOT COMPLETE |
| ENTRY 2 | VERTEX PARAMETERS, DRAWING PARAMETERS AND COORDINATES OF PG6 | NOT COMPLETE |
| ENTRY 3 | VERTEX PARAMETERS AND DRAWING PARAMETERS OF PG10 | NOT COMPLETE |
| ENTRY 4 | VERTEX PARAMETERS AND DRAWING PARAMETERS OF PG8 | NOT COMPLETE |

131

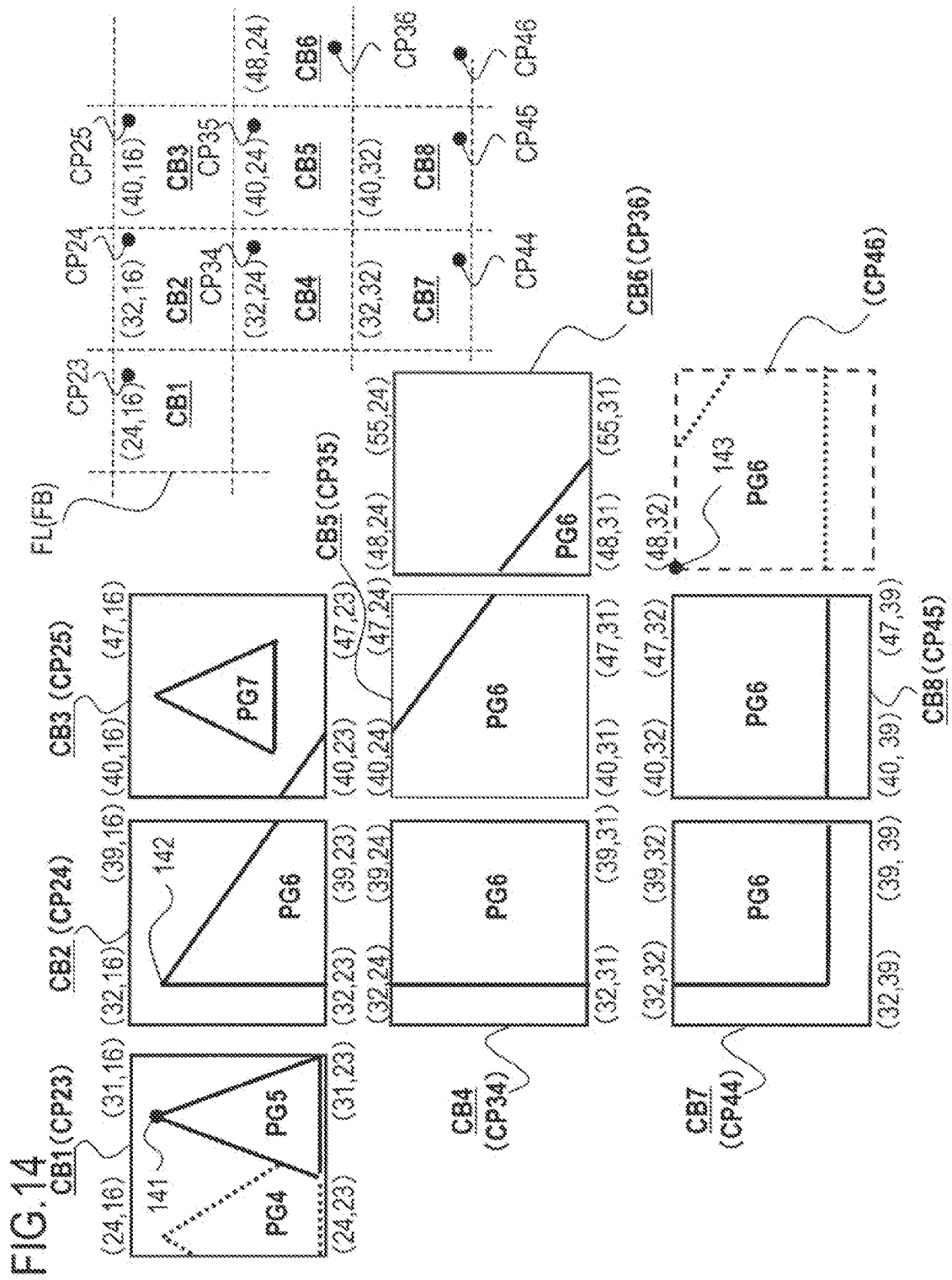

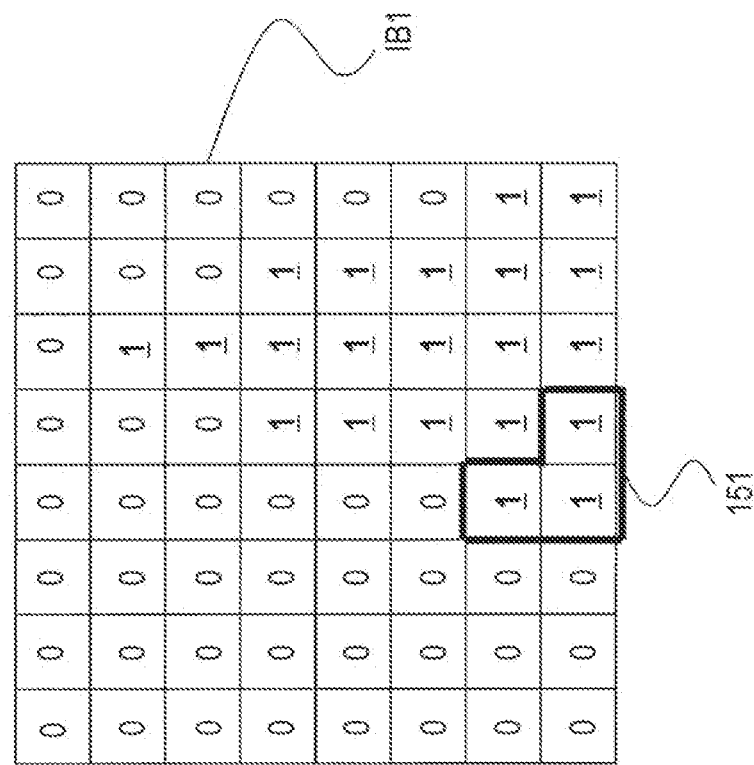
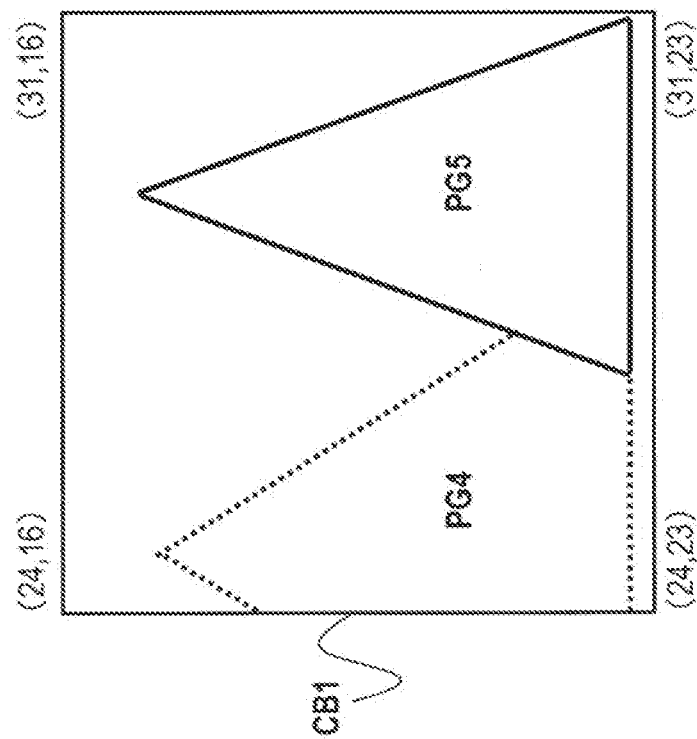
FIG.15

GRAPHIC PROCESSING APPARATUS AND COMPUTER-READABLE MEDIUM STORING GRAPHIC PROCESSING PROGRAM

CROSS-REFERENCE TO RELATED APPLICATION

This application is based upon and claims the benefit of priority of the prior Japanese Patent Application No. 2010-206860, filed on Sep. 15, 2010, the entire contents of which are incorporated herein by reference.

FIELD

The embodiment discussed herein is relates to a graphic processing apparatus.

BACKGROUND

In three-dimensional graphics, a graphics engine generates a two-dimensional image when a three-dimensional object is viewed from a predetermined visual point, based on three-dimensional data on the three-dimensional object, and writing data on each pixel of the two-dimensional image in a memory, whereby two-dimensional image data is generated. The image data stored in the memory is read by a display engine so as to be displayed on a display device.

In this image processing apparatus, DRAM is normally used as a memory for writing image data. DRAM has characteristics where memory access to continuous addresses is fast, but memory access to discontinuous addresses is slow. In concrete terms, a DRAM has a processing unit called a "page", and access within a same (continuous addresses) is fast, but accessing different pages (discontinuous addresses) generates a processing called a "page miss". If a page miss is generated, a DRAM controller must activate a new word line, and read data from the memory cell, during which the DRAM cannot be accessed for new reading.

However a three-dimensional object is normally drawn as a set of small lines and triangles, therefore a large quantity of discontinuous memory accesses is generated when the three-dimensional object is drawn in the DRAM, and memory access efficiency drops considerably.

As a method for improving this problem, a tiling architecture is known. According to the tiling architecture, the image processing apparatus divides a drawing space into a predetermined size (e.g. 8×8 pixels) of tiles, and performs drawing processing for all the graphics having pixels in a tile, using an internal memory, such as an SRAM, and writes the image data generated in the internal memory to an external memory (Japanese Translation of PCT Application No. 2002-529865). Since the image data is written to the external memory in tile units, DRAM is continuously accessed, and access efficiency improves.

According to the tiling architecture, however, the graphics engine generates drawing parameters having an increment value of each side of a polygon and an increment value of a span, and determines a polygon having a pixel in a tile, out of all the polygons, based on the vertex parameters of the polygon (e.g. a coordinate, depth, parameter value) for all the drawing target polygons for each tile. As a consequence, drawing parameter generation processing is required for all the polygons for each tile, and processing volume increases.

A possible method to prevent this problem is generating drawing parameters for all the drawing target polygons, and writing this data to an external memory, and reading the drawing parameters from the external memory when the drawing processing of a tile is performed, and determining a polygon having a pixel in the tile. According to this method, however, the graphics engine must access the external memory every time processing to read or write the drawing parameters is performed.

SUMMARY

According to one aspect of the embodiment, a graphic processing apparatus, comprises a chunk assignment unit which assigns a block in which a maximum N number of polygons are located, out of a plurality of polygons drawn in a frame buffer which is divided into a plurality of blocks, to a maximum M number of chunk buffers; a chunk generation unit which generates pixel data of a polygon located in a block assigned to the chunk buffer, out of the N number of polygons, and writes the pixel data to the chunk buffer; and a chunk writing unit which writes the pixel data written in the chunk buffer to the frame buffer, wherein a processing phase, including processing of assigning a chunk buffer by the chunk assignment unit, processing of generating and writing pixel data by the chunk generation unit, and processing of writing pixel data to the frame buffer by the chunk writing unit, is repeatedly executed for the plurality of polygons.

The object and advantages will be realized and attained by the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is an example of a polygon parameter buffer.

FIG. 11 illustrates an example of the polygon parameter indication buffer IB1 of the "chunk buffer CB1".

FIG. 13 is an example of the polygon parameter buffers in the drawing processing in the second and third phases.

FIG. 14 is a diagram for describing the chunk buffer assignment processing in the drawing processing in the second phase.

FIG. 15 illustrates an example of the polygon parameter indication buffer IB1 of the chunk buffer CB1 in the drawing processing in the second phase.

DESCRIPTION OF EMBODIMENTS

According to the graphic processing apparatus of the present embodiment, out of a plurality of polygons to be drawn in a frame buffer which is divided into a plurality of blocks, a block where the maximum N number of polygons are located are assigned to a maximum M number of chunk buffers. Out of the N number of polygons, the graphic processing apparatus generates pixel data of a polygon located in a block assigned to a chunk buffer, and writes the pixel data to the chunk buffer, and writes the pixel data written in the chunk buffer to the frame buffer. The graphic processing apparatus repeats these processings for a plurality of drawing target polygons.

By this, the pixel data of the maximum N number of polygons is written to the chunk buffers corresponding to the maximum M numbers of blocks, without accessing an external memory. Furthermore, continuous addresses of the frame buffer are accessed by the generated pixel data being written to the frame buffer in chunk buffer units.

Figure 1:
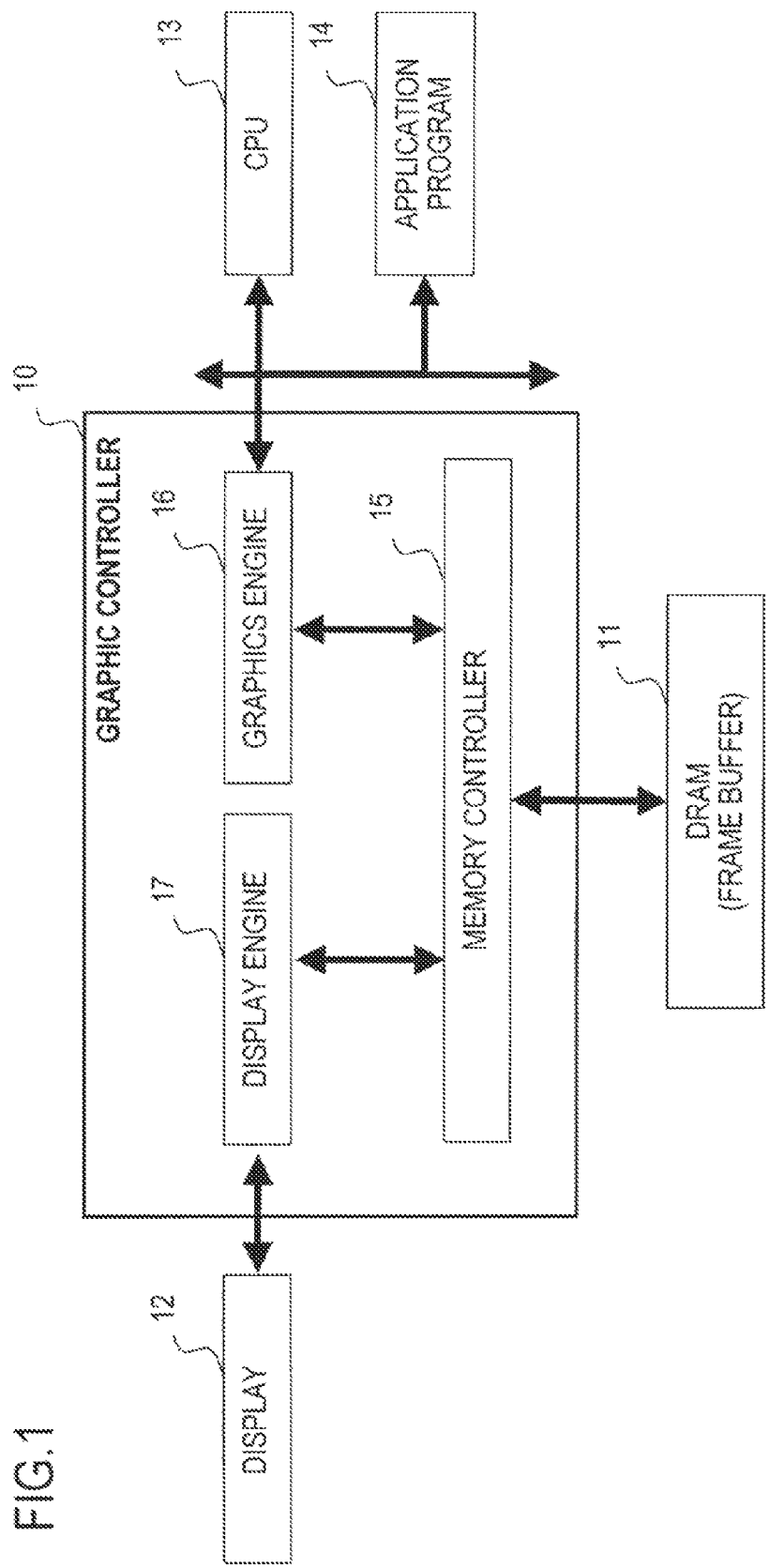
FIG. 1 illustrates an example of a configuration of the graphic processing apparatus according to the present embodiment.

FIG. 1 illustrates an example of a configuration of the graphic processing apparatus according to the present embodiment. In FIG. 1, the graphic processing apparatus has a graphics controller 10, a DRAM 11, a display device 12, a CPU 13 and an application program 14. The graphics controller 10 includes a memory controller 15, a graphics engine 16, which represents the graphic processing apparatus of the present embodiment, and a display engine 17, which is a display device. The frame buffer according to the present embodiment is constituted by a DRAM.

In FIG. 1, three-dimensional data and a drawing command on a three-dimensional object constituted by a plurality of polygons are transferred from the application to the graphics engine 16. Based on the three-dimensional data, the graphics engine 16 generates pixel data of a two-dimensional image which is supposed to be viewed when the three-dimensional object is viewed from a predetermined visual point, and writes the pixel data to a DRAM 11 via the memory controller 15. Then the display engine 17 reads drawing data from the DRAM 11 via the memory controller 15, and displays the drawing data on the display screen of the display device 12.

Figure 2:
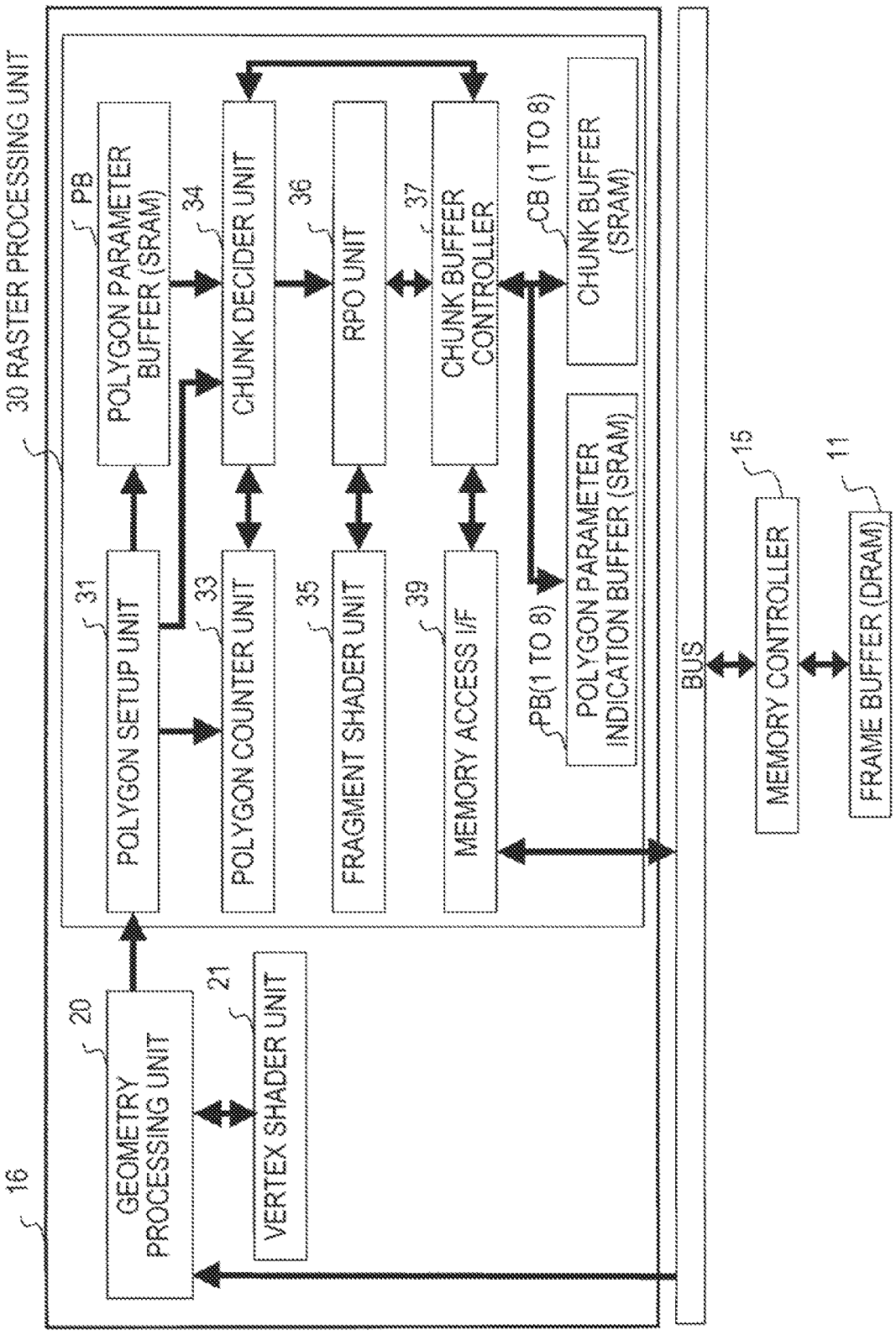
FIG. 2 illustrates an example of a configuration of the graphics engine.

FIG. 2 illustrates an example of a configuration of the graphics engine 16. The graphics engine 16 has a geometry processing unit 20 and a raster processing unit 30.

Normally a three-dimensional object is represented by a set of many polygons. For a polygon, a triangle is normally used. The geometry processing unit 20 interprets a drawing command, transfers three-dimensional data to a vertex shader unit 21, which executes an arbitrary processing according to a user program, and generates a polygon vertex parameter which is two-dimensional coordinates on the display screen. The generated vertex parameter is transferred to the raster processing unit 30.

Figure 3:
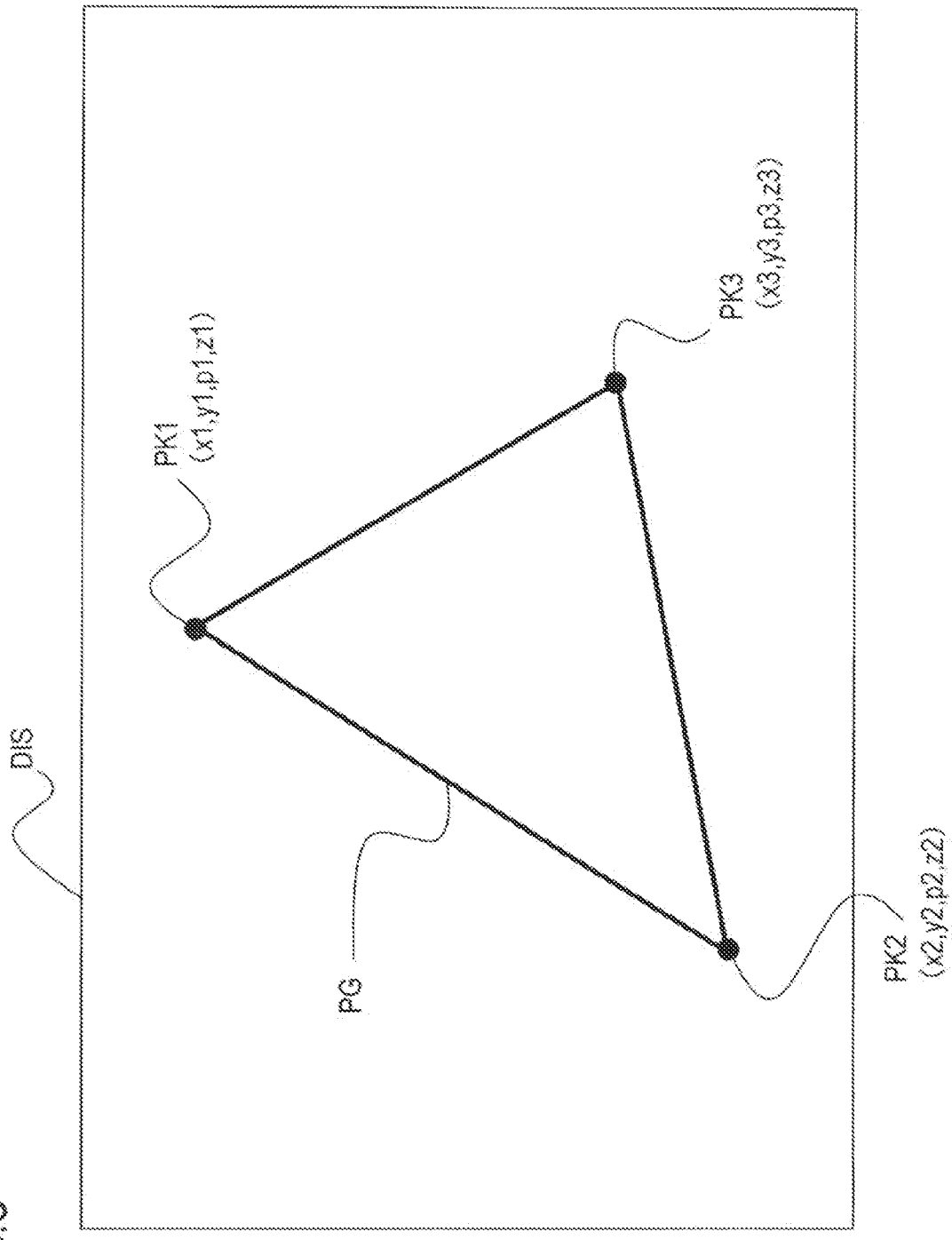
FIG. 3 illustrates an example of a vertex parameter of a polygon generated by the geometry processing unit.

FIG. 3 illustrates an example of a vertex parameter of a polygon generated by the geometry processing unit 20. The vertex parameter of a polygon PG includes coordinates (x1, y1), (x2, y2) and (x3, y3) of each vertex PK1 to 3 on a display screen DIS, and the gradation values of each R, G, B color (hereafter called "color") p1 to p3 which is an image parameter at each vertex coordinate, and distance in the depth direction (hereafter called "depth") z1 to z3 which is an image parameter at each vertex. In the example in FIG. 3, the color and depth are illustrated as an example of the image parameters, but the image parameters may also include a texture coordinate value for displaying texture, and an alpha value for alpha blending.

Referring back to FIG. 2, the raster processing unit 30 generates image data based on vertex parameters of a polygon, for each pixel in a polygon region determined by the vertex parameters. The raster processing unit 30 of the present embodiment scans each "8×8 pixel" sized block, for example, generated by driving the frame buffer, and generates pixel data of each pixel of a polygon located in the block by executing scanning in X and Y directions.

The raster processing unit 30 has a polygon setup unit 31, a polygon parameter buffer PB, a polygon counter unit 33, a chunk decider unit 34, an RPO (Rasterizer and Pixel Operator) unit 36, a fragment shader unit 35, a chunk buffer controller 37, a chunk buffer CB, a memory access I/F 39 and a polygon parameter indication buffer IB.

The polygon setup unit 31 sequentially receives vertex parameters of a polygon from the geometry processing unit 20, and generates drawing parameters based on the vertex parameters. The drawing parameters are an inclination (increment value) of the X coordinate along each side of the polygon, an increment value of each image parameter and an incremental value of an image parameter along each span.

Figure 4:
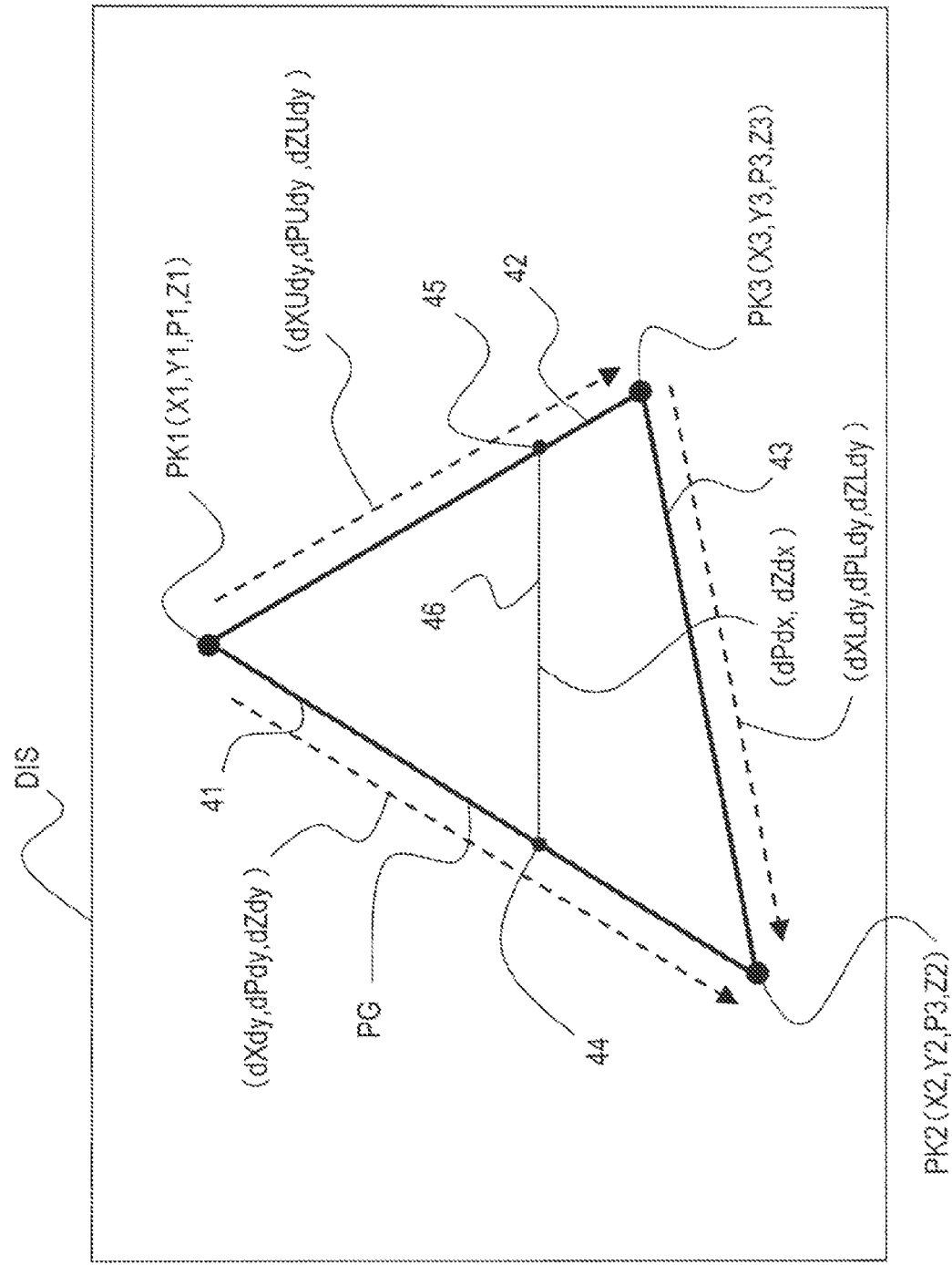
FIG. 4 illustrates an example of the drawing parameters.

FIG. 4 illustrates an example of the drawing parameters. In FIG. 4, sides 41 to 43 are a respective side of a polygon PG, and a lateral line 46 indicates an example of a span of the polygon PG. The span 46 is a line of pixels between the left edge 44 and the right edge 45 of the polygon PG along the raster scan direction (X direction). The polygon setup unit 31 calculates increment values in the X coordinate along each side 41 to 43 of the polygon PG (dXdy, dXLdy, dXUdy), increment values of a color which is an image parameter (dPdy, dPLdy, dPUdy), increment values of depth (dZdy, dZLdy, dZUdy) and increment values of each image parameter (dPdx, dZdx) along each span 46, as the drawing parameters.

The polygon setup unit 31 sequentially stores the vertex parameters and the generated drawing parameters of a maximum N number of polygons in the polygon parameter buffer PB. In the present embodiment, an upper limit number N of polygons stored in the polygon parameter buffer PB is 4 (N=4).

FIG. 5 is an example of a polygon parameter buffer PB. As FIG. 5 illustrates, parameters of a maximum four polygons are stored. The parameters are stored in association with entry numbers 1 to 4, for example. In addition to the parameters of the polygon, each entry has a flag which indicates whether the generation of pixel data of the polygon has completed or not. Initially "not complete" is written to a flag, since the generation of the image data has not completed.

Referring back to FIG. 2, the polygon counter unit 33 counts a number of polygons of which parameters are stored in the polygon parameter buffer PB, and starts up the chunk decider unit 34 when the number of polygons reaches four. The chunk decider unit 34 assigns blocks on a frame buffer where the four polygons are located to the maximum M number of chunk buffers CB. The chunk buffer CB is constituted by an SRAM which can be accessed at high-speed, and is a buffer having a same size as the maximum M number of blocks, and pixel data is written in each pixel. The pixel data has, for example, the gradation value of each color R, G and B, and the Z value to indicate depth or the like. In the present embodiment, an upper limit number M of chunk buffers is 8 (M=8).

Figure 6:
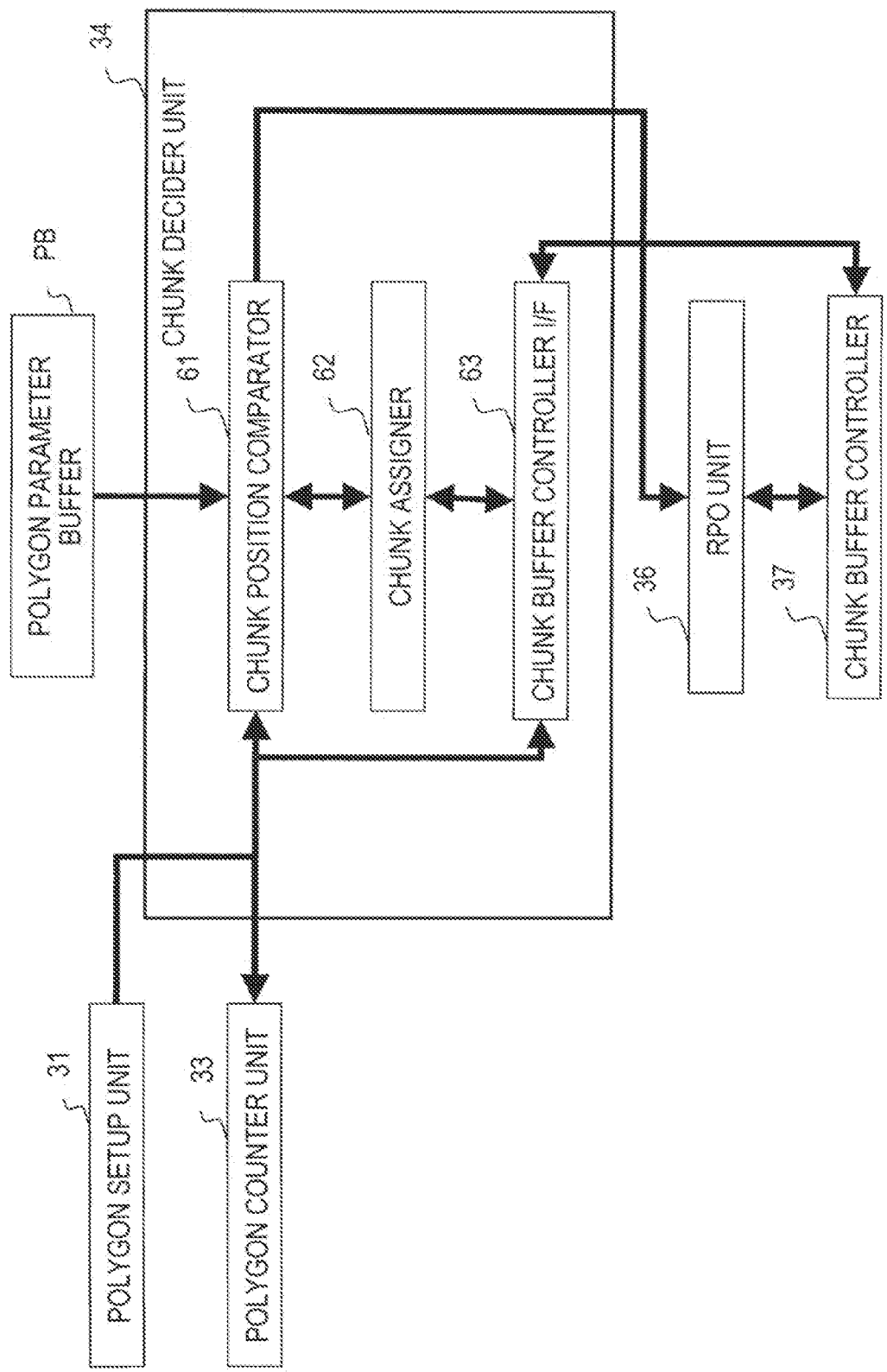
FIG. 6 illustrates an example of a configuration of a chunk decider unit.

FIG. 6 illustrates an example of a configuration of a chunk decider unit 34. The chunk decider unit 34 has a chunk position comparator 61, a chunk assigner 62 and a chunk buffer controller I/F 63. Details of the processing of each unit will be described later using a flow chart.

Referring back to FIG. 2, the RPO unit 36 generates an entry number in the polygon parameter indication buffer IB for each block to which the chunk buffer CB is assigned. The polygon parameter indication buffer IB is constituted by an SRAM which can be accessed at high-speed, and is a buffer which can store the entry numbers for a number of pixels of the maximum M number of blocks, and for each pixel, an entry number (1 to 4 in the present embodiment) in the polygon parameter buffer PB of a polygon drawn in this pixel is stored. Therefore in the case of a pixel where polygons overlap, an entry number of a polygon drawn in front is stored.

Then referring to the polygon parameter indication buffer IB, the RPO unit 36 generates pixel data of each pixel of a polygon located in a block assigned to the chunk buffer CB. The RPO unit 36 transfers adjacent four pixels (quad) to the fragment shader unit 35 as one unit, so that the fragment shader unit 35 executes an arbitrary processing on the pixel data according to the user program. The RPO unit 36 writes the generated pixel data into the chunk buffer CB.

The chunk buffer controller 37 writes the chunk buffer CB where the pixel data was written, to the frame buffer 11 in an external memory, such as a DRAM, via the memory access I/F 39.

Figure 7:
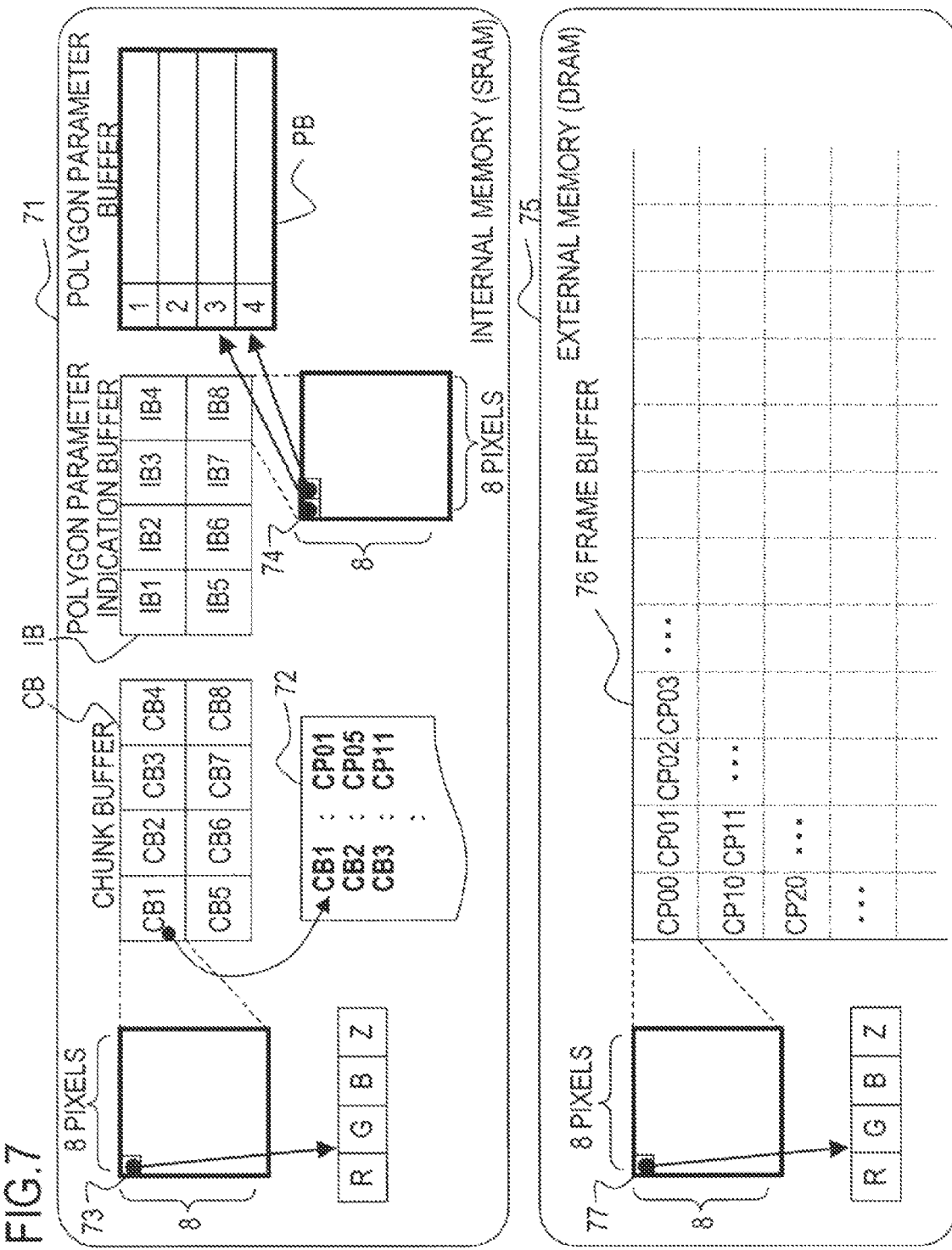
FIG. 7 illustrates information stored in each memory of the graphics engine.

FIG. 7 illustrates information stored in each memory of the graphics engine 16 in FIG. 1. As FIG. 7 illustrates, the graphics engine 16 has an external memory 75 (DRAM 11 in FIG. 1), such as a DRAM, and an internal memory 71, such as an SRAM, which can be accessed faster than the external memory. The internal memory 71 has a polygon parameter buffer PB where the parameters of a maximum of four (N number of) polygons, a maximum of eight (M number of) chunk buffers CB (CB1-CB8) and polygon parameter indication buffers IB (IB1-IB8) are stored. The internal memory 71 also has chunk assignment information 72 which indicates which block (CP00-) of the frame buffer 76 each chunk buffer CB corresponds to. In other words, the correspondence information of the chunk buffer numbers "CB1-CB8" and the block number "from CP00" in the frame buffer 76 is stored in the chunk assignment information 72.

As mentioned above, each pixel 73 of the chunk buffer CB has pixel data on a gradation value of each color R, G and B, a Z value, and each pixel 74 of the polygon parameter indication buffer IB has an entry number of the drawing target polygon in the polygon parameter buffer PB.

The external memory 75, on the other hand, has the frame buffer 76 which stores the pixel data generated by the graphics engine 16 of the present embodiment. The frame buffer 76 of the present embodiment is divided into blocks (CP00-) each of which is 8×8 pixels, each pixel 77 of each block has a gradation value of each color R, G and B and a Z value, just like the chunk buffer CB. In the frame buffer 76 before drawing processing, default pixel data is stored.

Figure 8:
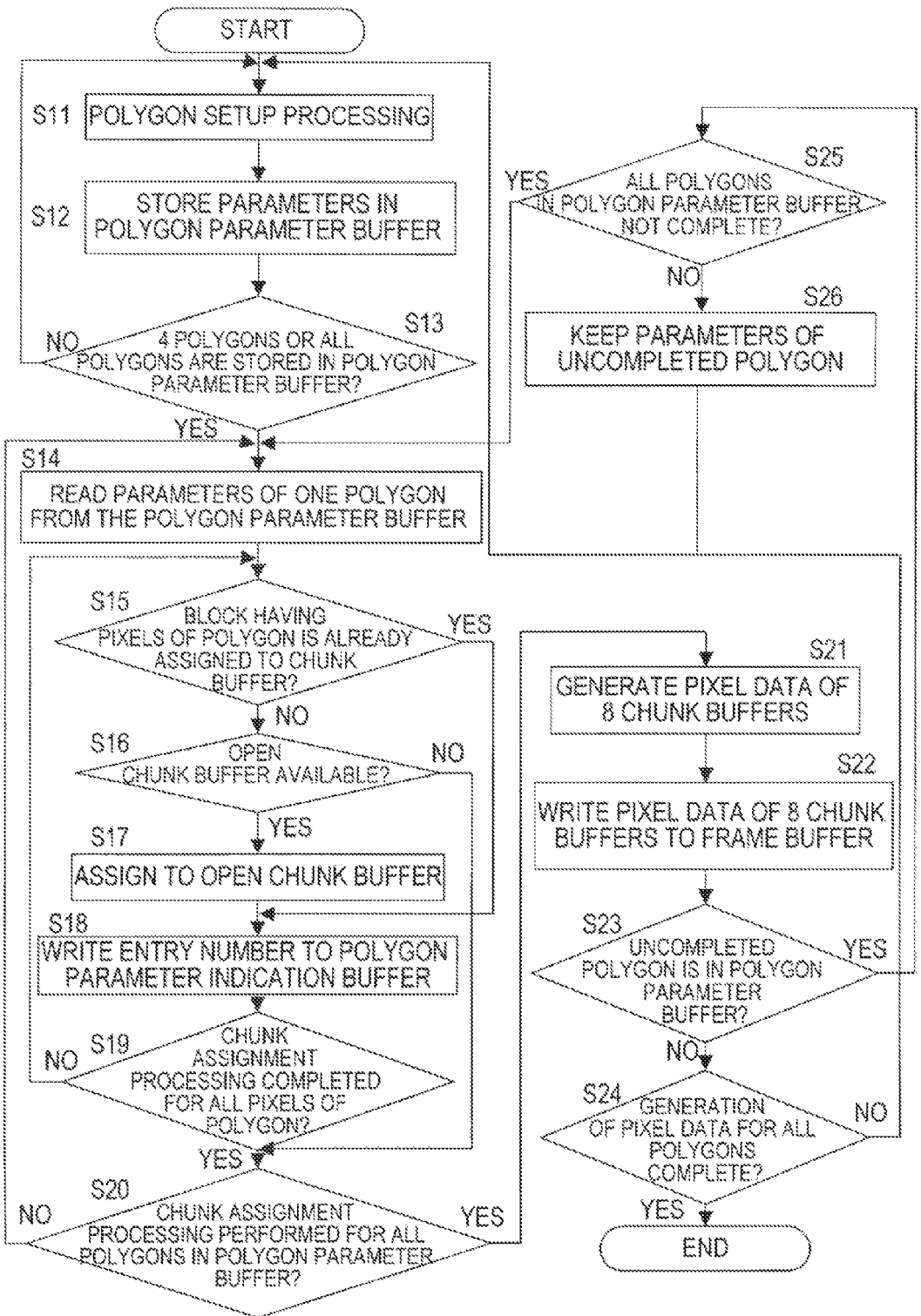
FIG. 8 is a flow chart depicting details of the drawing processing of the graphics engine.

FIG. 8 is a flow chart depicting details of the drawing processing of the graphics engine 16 according to the present embodiment. As a polygon setup processing, the polygon setup unit 31 in FIG. 2 sequentially receives vertex parameters of a polygon from the geometry processing unit 20, and generates drawing parameters of the polygon (S11). Then the polygon setup unit 31 stores the generated drawing parameters and the vertex parameters in the polygon parameter buffer PB (S12). The polygon setup unit 31 performs processings S11 and S12, until the parameters of four (N number of) polygons are stored in the polygon parameter buffer PB, or until the parameters of all the polygons to be drawn are stored in the frame buffer (YES in S13).

If S13 is YES, the chunk decider unit 34 reads the parameters of a polygon sequentially from the polygon parameter buffer PB (S14). Then the chunk position comparator 61 in the chunk decider unit 34 illustrated in FIG. 6 determines whether blocks, including the coordinates of pixels in the read polygon, have already been assigned to the chunk buffer CB (S15). In concrete terms, the chunk position comparator 61 obtains the coordinate information on the blocks already assigned to the chunk buffer CB from the chunk buffer controller 37, and determines whether coordinates of the polygon is included in the coordinate region of this block.

If S15 is NO, and if there is an open chunk buffer (YES in S16), then the chunk position comparator 61 instructs the chunk assigner 62 to assign a block, including the coordinates of the pixels of the polygon, to the chunk buffer CB (S17). In concrete terms, the chunk assigner 62 sends the coordinate information of an assignment target block, along with a chunk buffer assignment request, to the chunk buffer controller 37 (FIG. 2). If a number of assigned chunk buffers CB has not yet reached eight, the chunk buffer controller 37 determines that there is an open chunk buffer CB, and assigns the target block to the chunk buffer CB, and notifies the chunk buffer number (hereafter chunk numbers CB1-CB8) to the chunk assigner 62. Correspondence information of the coordinate information on the block and the chunk number is recorded as the assignment information 72 (FIG. 7).

The chunk position comparator 61 (FIG. 6) transfers the chunk number and the parameters of the polygon to the RPO unit 36 (FIG. 2), and based on the information, the RPO unit 36 generates an entry number in the polygon parameter indication buffer IB for the block assigned to the chunk buffer CB (S18). In concrete terms, the RPO unit 36 generates an entry number in the polygon indication buffer IB as follows.

First if a new block is assigned to a chunk buffer CB, the RPO unit 36 reads pixel data of a block corresponding to the chunk number from the frame buffer, and writes the data to the corresponding chunk buffer CB. Based on the parameters of the polygon, the RPO unit 36 generates a Z value of each pixel of the polygon in the block assigned to the chunk buffer CB. In concrete terms, the RPO unit 36 determines the Z value of each pixel on the left side 41 by sequentially adding an increment value of a Z value (drawing parameter) of the left side 41 to the Z value (vertex parameter) of the top vertex (PK1 in FIG. 4) of the polygon. Then, for each span (46 in FIG. 4), the RPO unit 36 sequentially adds an increment value of a Z value of each span to the Z value of the left edge pixel (44 in FIG. 4), whereby the Z value of each pixel on the span is obtained.

Then the RPO unit 36 performs a depth test by comparing the Z value of each pixel of the polygon in the block and the Z value of a corresponding pixel in the chunk buffer CB. In concrete terms, if the Z value of the polygon is smaller than the Z value of the chunk buffer CB, this polygon is drawn in front, therefore the entry number of this polygon in the polygon parameter buffer PB is written by the RPO unit 36 to a corresponding pixel in the polygon parameter indication buffer IB. In this way, the RPO unit 36 generates an entry number of a polygon to be drawn for each pixel, and stores the entry numbers in the polygon parameter indication buffer IB.

After generating the entry numbers of the polygon parameter indication buffer IB (S18), the chunk decider unit 34 determines whether the processing for assigning a block, including the target pixel, to the chunk buffer CB (hereafter chunk assignment processing) has completed for all the pixel of the polygon which was read (S19). If the assignment processing is not completed for all the pixels of the polygon (NO in S19), processing returns to S15, and the chunk decider unit 34 performs chunk assignment processing for the pixels of the polygon, which are located outside the block assigned to the chunk buffer CB (S15 to S19).

If the chunk assignment processing has completed for all the pixels of the polygon which was read (YES in S19), the chunk decider unit 34 updates the flag in the polygon parameter buffer PB of the polygon which was read (see FIG. 5), from "not complete" to "complete", and also determines whether a sequence of the chunk assignment processing has performed for all the polygons in the polygon parameter buffer PB (S20). If there is a polygon for which the assignment processing has not performed (NO in S20), the chunk decider unit 34 reads parameters of the next polygon from the polygon parameter buffer PB (S14). Then the chunk assignment processing is performed for the next polygon in the same manner (S15 to S19).

In S 15, if the block including the coordinates of the pixels of the polygon has already been assigned to the chunk buffer CB (YES in S15), this chunk number and the parameters of the polygon are transferred from the chunk position comparator 61 to the RPO unit 36, and based on this information, the RPO unit 35 updates the entry number in the already generated polygon parameter indication buffer IB (S18). In concrete terms, the RPO unit 36 calculates a Z value of each pixel of the polygon in the block, and if this Z value is smaller than the Z value of a corresponding pixel in the chunk buffer CB, the RPO unit 36 overwrites the entry number of this polygon on the corresponding pixel in the polygon parameter indication buffer IB.

If the block including the coordinates of the pixels of the polygon is not assigned to the chunk buffer (NO in S15), and if there is not an open chunk buffer (NO in S16), the chunk assignment processing of this polygon ends even if the chunk assignment processing has not yet been completed for all the pixels of the polygon. Then the chunk decider 34 determines whether the chunk assignment processing has been performed for all the polygons in the polygon parameter buffer PB (S20), and if not performed (NO in S20), the chunk decider unit 34 reads the parameters of the next polygon (S14), and if performed (YES in S20), the chunk decider unit 34 instructs the RPO unit 36 to generate image data in the chunk buffer CB.

As a result of performing the chunk assignment processing for all of the four polygons in the polygon parameter buffer PB (YES in S20), a chunk buffer CB may be assigned to all the pixels of all the polygons, but in some cases, no chunk buffer CB may be assigned to a part of pixels in a polygon or no chunk buffer may be assigned in any way to a part of the polygons. This is because the capacity of the chunk buffer CB is limited to the capacity for eight blocks. On the other hand, in some cases, a chunk buffer is assigned to all the pixels of all the polygons, but a part of the chunk buffers is in an unassigned state.

Then referring to the polygon parameter indication buffer IB generated for each chunk buffer, the RPO unit 36 generates pixel data for each pixel of the chunk buffer CB (S21). Based on the entry number stored in each pixel of the polygon parameter indication buffer IB, the RPO unit 36 obtains parameters of the polygon to be drawn in this pixel from the polygon parameter buffer PB, and generates pixel data.

In concrete terms, based on the parameters, the RPO unit 36 sequentially adds the increment value of each image parameter (drawing parameter) on the left side of the polygon (41 in FIG. 4) to the value of the image parameter (vertex parameter) of the top vertex (PK1 in FIG. 4) of the polygon, whereby the pixel data of each pixel on the left side 41 is determined. The RPO unit 36 obtains pixel data of each pixel on the span by sequentially adding the increment value to each image parameter value of the pixel on the left edge (44 in FIG. 4) for each span (46 in FIG. 4).

The fragment shader unit 35 processes the image data for a plurality of adjacent pixels (quad) as one unit, so the RPO unit 36 transfers the pixel data to the fragment shader unit 35 in quad units. Then the RPO unit 36 writes the pixel data processed by the fragment shader unit 35 to the chunk buffer CB via the chunk buffer controller I/F 63.

In this way, the RPO unit 36 obtains the parameters of a polygon drawn in each pixel of a quad based on the entry number in the polygon parameter indication buffer IB. Therefore the RPO unit 36 can directly associate the parameters of the drawing target polygon to each pixel in the quad based on the entry number of the polygon parameter indication buffer IB, and can generate the pixel data in quad units at high-speed.

If the pixel data of the chunk buffer CB is generated (S21), the chunk buffer controller 37 writes the pixel data in the chunk buffer CB to the frame buffer 11 via the memory access I/F 39 (S22). Since the pixel data is written not for each polygon but for each chunk buffer CB like this, continuous addresses in the frame buffer (DRAM) 11 are accessed, and access efficiency to the frame buffer (DRAM) 11 can be increased.

When writing the pixel data in the chunk buffer CB to the frame buffer 11 is over, the graphics engine 16 performs a polygon setup processing (S11 to S13), a chunk assignment processing (S14 to S20) and a pixel data generation processing in the chunk buffer CB (S21, S22) in the next phase. If there is a polygon for which pixel data generation processing has not been completed in the previous phase, the graphics engine 16 performs processing, including this polygon for which pixel data generation processing has no been completed, in the next phase. There the polygon setup unit 31 determines whether a polygon of which flag is "not complete" exists in the polygon parameter buffer PB (S23), and determines whether the flags of all the polygons in the polygon parameter buffer PB are "not complete" (S25).

If the flags of a part of the polygons in the polygon parameter buffer PB are "not complete" (YES in S23, NO in S25), the polygon setup unit 31 keeps the parameters of the entries of this part of polygons (S26), and writes the parameters of a new polygon in the other entries, and updates the polygon parameter buffer PB (S11, S12). If the flags of all the polygons in the polygon parameter buffer are "not complete" (YES in S23, YES in S25), then the polygon setup unit 31 does not update the polygon parameter buffer PB.

In other words, for the polygons for which pixel data generation has not been completed in the previous phase, the already generated parameters of a polygon are used, and chunk assignment processing and processing to generate pixel data for the chunk buffer CB are performed in the next phase continuously.

If the flags of all the polygons in the polygon parameter buffer PB are "complete" (NO in S23), on the other hand, the chunk decider unit 34 determines whether the generation of pixel data has been completed for all the polygons which are drawn in the frame buffer (S24). If the generation of the pixel data for all the polygons is completed (YES in S24), the drawing processing ends, and if the generation of pixel data for all the polygons has not been completed (NO in S24), the processing in S11 to S23 is performed until the generation of pixel data for all the polygons is completed.

Figure 9:
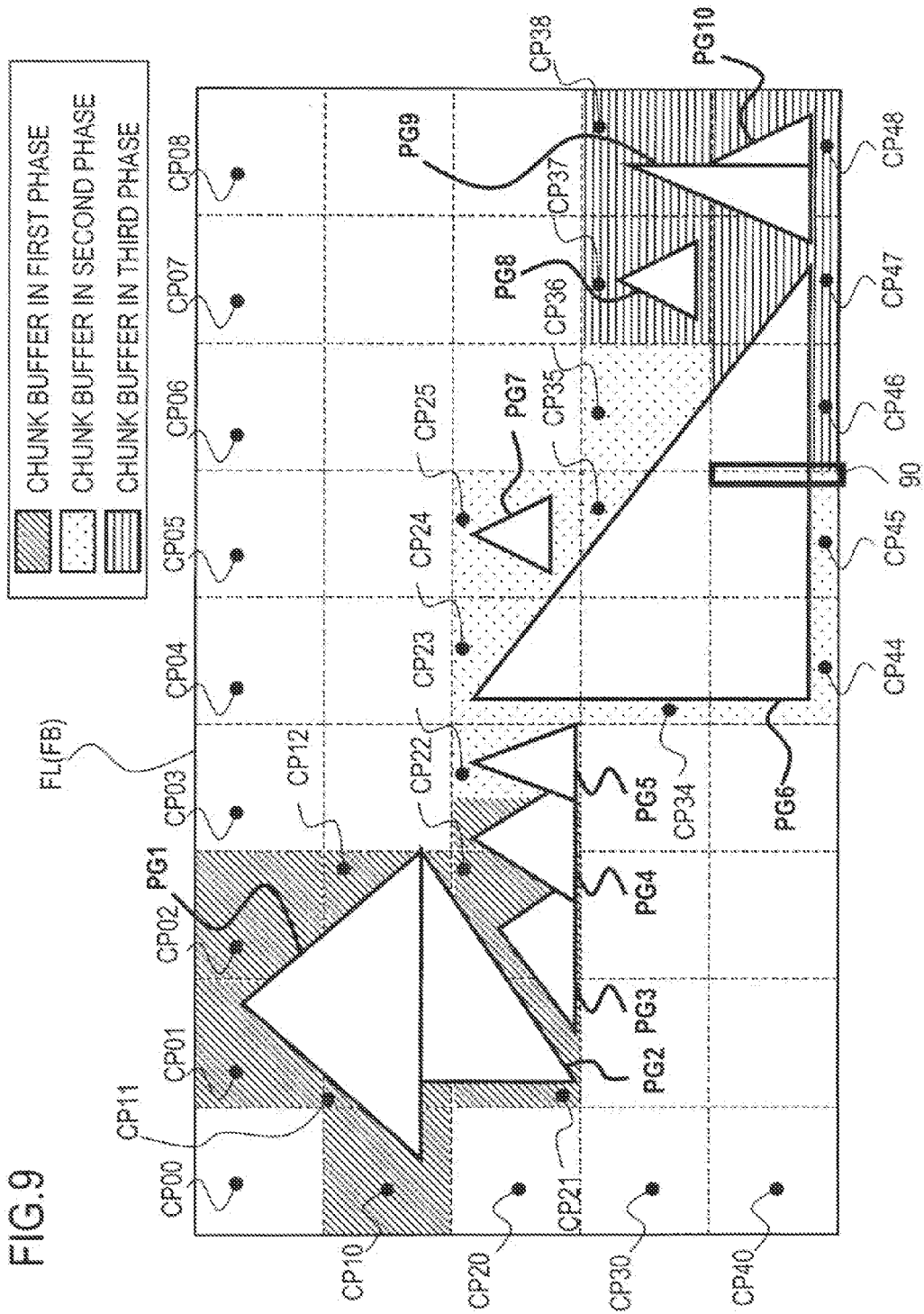
FIG. 9 illustrates an example of a drawing target polygon group in a frame.

FIG. 9 illustrates an example of a drawing target polygon group in a frame FL. In the example in FIG. 9, the frame FL is divided into "5×9=45" blocks CP00-CP48, and ten polygons PG1-PG10 are included. The pixel data on the frame FL is generated and stored in the frame buffer FB (DRAM 11). Now a processing to draw ten polygons (PG1-PG10) in FIG. 9 in the frame buffer FL (FB) by the above mentioned drawing processing will be described. In this example, it is assumed that the drawing processing is completed by three drawing processing phases. In FIG. 9, diagonal lines indicate the chunk buffers CB in a first phase, diagonal broken lines indicate those in a second phase, and the horizontal lines indicate those in a third phase. It is assumed that the frame buffer FL (FB) in this embodiment is divided into blocks CP00-CP48, each of which has 8×8 pixels.

<Drawing Processing in First Phase>

First a polygon setup processing is performed. The polygon setup unit 31 generates drawing parameters from the vertex parameters of four first polygons PG1-PG4 (S11), and stores the vertex parameters and the drawing parameters of the polygons PG1-PG4 in the polygon parameter buffer PB10, as illustrated in FIG. 5 (S12). Since the pixel data of each polygon has not been generated, the flags of polygons PG1-PG4 in the polygon parameter buffer PB10 are "not complete".

When the parameters of the four polygons are stored in the polygon parameter buffer PB10 (YES in S13), the chunk assignment processing starts and the chunk decider unit 34 reads the parameters of the "polygon PG1" in entry 1 from the polygon parameter buffer PB10 (S14). Then the chunk position comparator 61 determines whether the block including the top vertex coordinates of the "polygon PG1" has already been assigned to a chunk buffer (S15).

Figure 10:
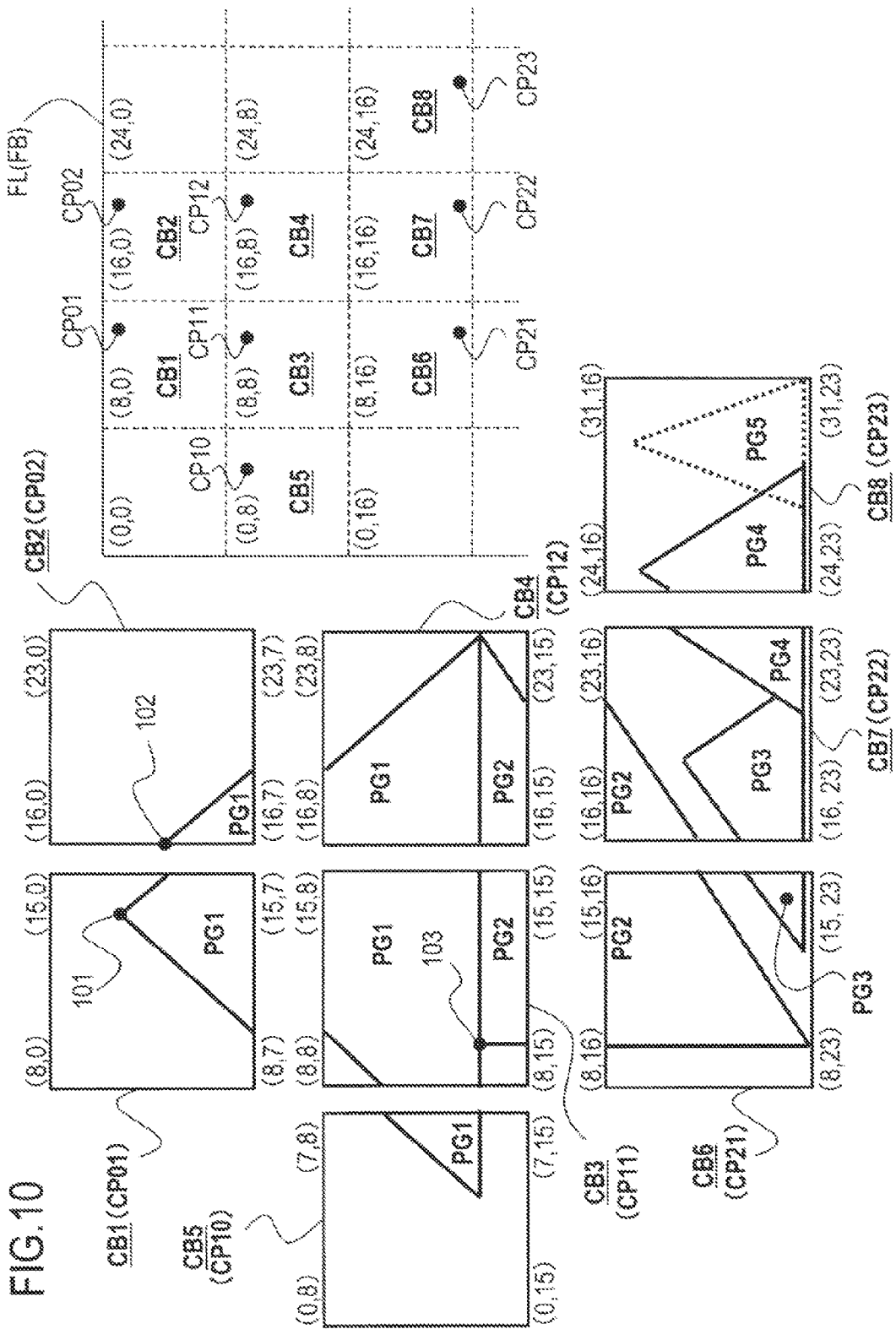
FIG. 10 is a diagram for describing the chunk buffer assignment processing in the drawing processing in the first phase.

FIG. 10 is a diagram for describing the chunk buffer assignment processing in the drawing processing in the first phase. In FIG. 10, correspondence of the chunk buffers CB1-CB8 and the polygons to be drawn in the chunk buffer is illustrated on the left, and correspondence of the chunk buffers CB1-CB8, blocks (CP00-) in the frame FL and the coordinates thereof is illustrated on the right. In the initial state of the drawing processing, there is no assigned chunk buffers (NO in S15, YES in S16), hence the chunk assigner 62 assigns the "chunk buffer CB1" to the "block CP01" including the top vertex coordinate 101 of the "polygon PG1" (S17). Then the chunk number "CB1" of the "chunk buffer CB1" and the parameters of the "polygon PG1" are transferred to the RPO unit 36, and the RPO unit 36 generates an entry number in the polygon parameter indication buffer IB1 of the chunk number "CB1" (see FIG. 7, FIG. 11) (S18).

In concrete terms, the RPO unit 36 reads the default pixel data (initial value) on the frame buffer FL (FB) of the "block CP01" which corresponds to the chunk number "CB1", and writes the pixel data to the "chunk buffer CB1". Since a large Z value is stored in the default pixel data of the frame buffer FL (FB), the entry number "1" of the polygon parameter buffer (BP10 in FIG. 5) of the "polygon PG1" is written in each pixel where the "polygon PG1" is drawn in the polygon parameter indication buffer IB1, according to the result of the depth test.

FIG. 11 illustrates an example of the polygon parameter indication buffer IB1 of the "chunk buffer CB1". By the above mentioned processing S18, the entry number "1" in the polygon parameter buffer PB10 is written in pixels where the "polygon PG1" is drawn.

Since the chunk assignment processing for all the pixels in the "polygon PG1" has not been completed in FIG. 10 (NO in S19), the chunk position comparator 61 determines whether the "block CP02", which is a pixel of the "polygon PG1" and also includes the pixel 102 outside the "block CP01", has been assigned to a chunk buffer (S15). Since the "block CP02" has not been assigned to a chunk buffer (NO in S15), and there is an open chunk buffer (YES in S16), the chunk assigner 62 assigns the "block CP02" to the "chunk buffer CB2" (S17). In the same manner, the RPO unit 36 writes the entry number "1" of the "polygon PG1" in the polygon parameter indication buffer IB2 which corresponds to the "chunk buffer CB2" (S18).

Then the chunk assignment processing (S15 to S19) is performed for the "polygon PG1", and the "chunk buffers CB3-CB5" are assigned to the "blocks CP10-CP12" for the polygon PG1, and an entry number in each polygon parameter indication buffer IB3-IB5 is generated. At this point, the chunk assignment processing for all the pixels in the polygon PG1 is completed (YES in S19), therefore the chunk decider 34 updates the flag of the "polygon PG1" in the polygon parameter buffer PB1 to "complete".

Then the chunk decider unit 34 reads the parameters of the "polygon PG2" from the polygon parameter buffer PB1 (S14), and the chunk position comparator 61 obtains coordinate information of the "blocks CP01-CP02 and CP10-CP12", which have already been assigned to chunk buffers. Then the chunk position comparator 61 determines whether the top vertex coordinate 103 of the "polygon PG2" is included in an already assigned block (S15). The vertex coordinate 103 is included in the "block CP11", which is assigned to the "chunk buffer CB3" (YES in S15), therefore the RPO unit 36 performs a depth test and writes an entry number of the "polygon PG2" in corresponding pixels in the polygon parameter indication buffer IB3 (S18).

Figure 12:
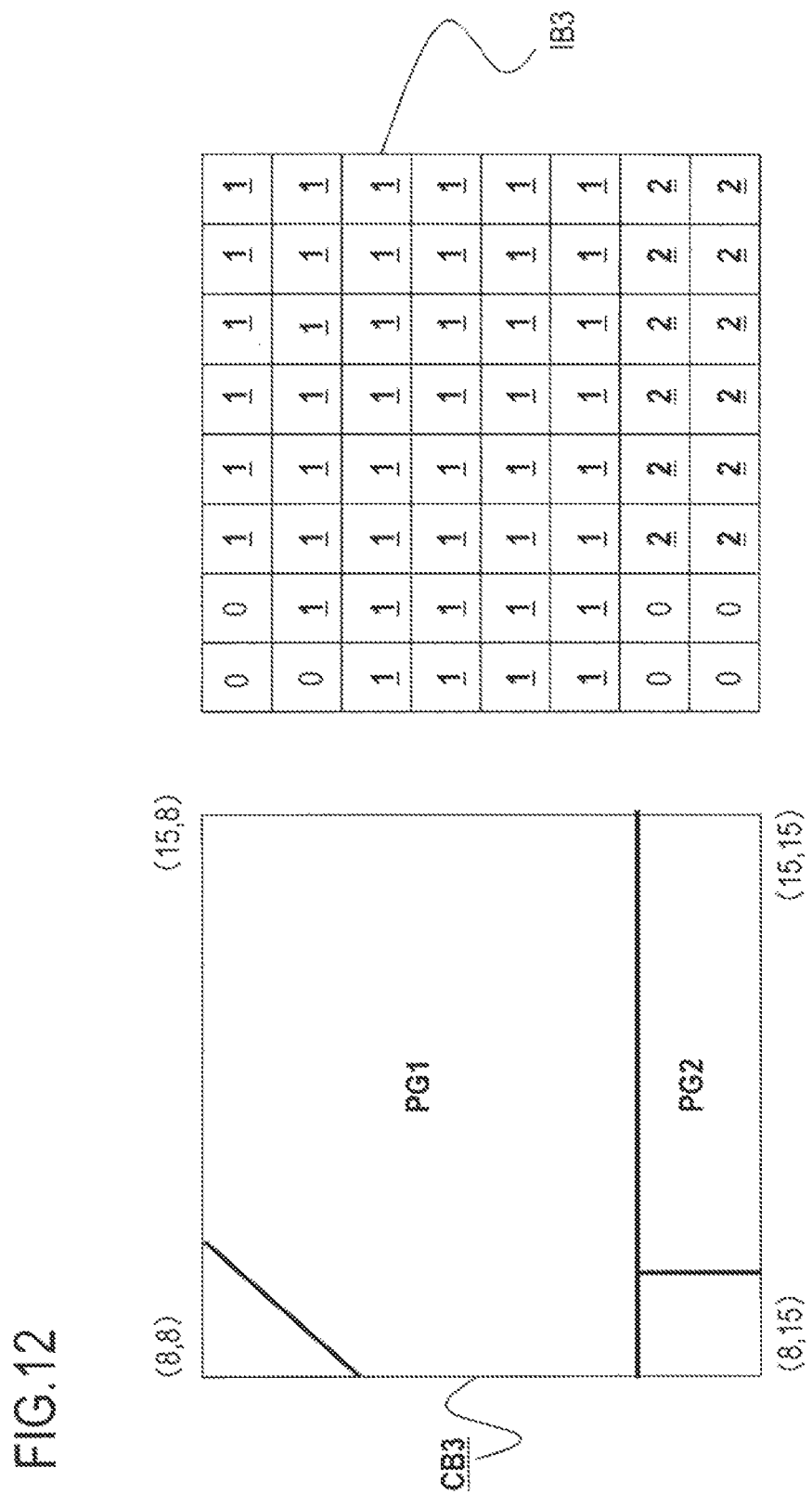
FIG. 12 illustrates an example of the polygon parameters indication buffer IB3 of the "chunk buffer CB3".

FIG. 12 illustrates an example of the polygon parameters indication buffer IB3 of the "chunk buffer CB3". As FIG. 12 illustrates, the entry number "2" of the "polygon PG2" in the polygon parameter buffer PB10 (FIG. 5) is written in the pixels where the "polygon PG2" is drawn. The polygon PG1 and the polygon PG2 are not overlapped.

As FIG. 10 illustrates, as for the "polygon PG2", the "block CP12" having the pixels of the "polygon PG2" has already been assigned to the "chunk buffer CB4", so the RPO unit 36 performs the depth test and updates the entry numbers in the polygon parameter indication buffer IB4. The "blocks CP21 and CP22" are assigned to the "chunk buffers CB6 and CB7".

In the same manner, as for the "polygon PG3", the "blocks CP21, CP22" having the pixels of the "polygon PG3" have already been assigned to the "chunk buffers CB6 and CB7", so the RPO unit 36 performs the depth test and updates the entry numbers in the polygon parameter indication buffers IB6 and IB7. As for the "polygon PG4", the block having the pixels of the "polygon PG4" has already been assigned to the "chunk buffer CB7", the RPO unit 36 updates the entry numbers in the polygon parameter indication buffer IB7, and the "block CP23" is assigned to the "chunk buffer CB8". Then the flags of "PG2-PG4" in the polygon parameter buffer PB10 are updated to "complete".

In this way, for all the pixels of the polygons PG1-PG4, eight blocks including the respective pixels are dynamically assigned to the chunk buffers CB1-CB8, and entry numbers in the polygon parameter indication buffers IB1IB8 corresponding to each chunk buffer are generated. In the "block CP23" corresponding to the "chunk buffer CB8", the "polygon PG5" is drawn, but the "polygon PG5" is not included in the polygon parameter buffer PB10, hence the drawing processing for the "polygon PG5" is not performed.

Then the RPO unit 36 obtains the parameters of the polygon to be drawn in each pixel from the polygon parameter buffer PB10 based on the entry number stored in each pixel of the polygon parameter indication buffers IB1-IB8, and generates the pixel data, and stores the pixel data in the chunk buffers CB1-CB8 (S21). Then the pixel data in the chunk buffers CB1-CB8 is written to the frame buffer FL (FB) (S22), and the assignment information 72 with the chunk buffer of the block held in the internal memory is cleared.

The pixel data is generated only for each pixel of which entry number is written in the polygon parameter indication buffers IB1-IB8. Therefore the chunk buffer controller 37 may write the pixel data in the chunk buffers CB1-CB8 to the frame buffer FL (FB) only for each pixel of which entry number is written in the polygon parameter indication buffers IB1-IB8. Then the amount of the pixel data written in the frame buffer FL (FB) can be controlled.

Then the polygon setup unit 31 clears information of all the entries, since the flags of all the entries in the polygon parameter buffer PB10 are "complete", and stores the parameters of the new polygons PG5-PG8 (S11, 12).

<Drawing Processing in Second Phase>

FIG. 13 is an example of the polygon parameter buffers in the drawing processing in the second and third phases. The polygon parameter buffer PB20 in FIG. 13 is a polygon parameter buffer in the drawing processing in the second phase, and the parameters of new polygons PG5-PG8 are stored with a flag "not complete".

FIG. 14 is a diagram for describing the chunk buffer assignment processing in the drawing processing in the second phase. Just like FIG. 10, correspondence of the chunk buffers CB1-CB8 and the polygons drawn in the chunk buffer is illustrated on the left, and correspondence of the chunk buffers CB1-CB8, blocks (CP00-) in the frame FL and coordinates thereof is illustrated on the right. The chunk assigner 62 assigns the "chunk buffer CB1" to the "block CP23" including the top vertex coordinates 141 of the "polygon PG5" (S17). Then the RPO unit 36 generates an entry number in the polygon parameter indication buffer IB1 corresponding to the "chunk buffer CB1" (S18).

At this time, the pixel data of "polygon PG4" has already been stored in the "block CP23" of the frame buffer. Therefore when the entry number in the polygon parameter indication buffer IB1 is generated, the pixel data of "block CP23", in which the pixel data of the "polygon PG4" is stored, is read from the frame buffer FL (FB), and is written to the "chunk buffer CB1". If a Z value of a pixel of the "polygon PG5" is smaller than a Z value of a corresponding pixel in the "chunk buffer CB1" in which the pixel data of the "polygon PG4" is written, the RPO unit 36 writes an entry number of the "polygon PG5" to the polygon parameter indication buffer IB1.

FIG. 15 illustrates an example of the polygon parameter indication buffer IB1 of the chunk buffer CB1 in the drawing processing in the second phase. A pixel group 151 enclosed with the bold line shows pixels where the "polygon PG4" and the "polygon PG5" overlap. Since the "polygon PG5" is drawn in front of the "polygon PG4", the Z value of the "polygon PG5" is smaller than the Z value of the "chunk buffer CB1". Therefore the entry number "1" in the polygon parameter buffer PB20 of the "polygon PG5" is written in the pixel group 151, as illustrated in FIG. 15.

If a number of target polygons in one drawing processing is limited to 4 (N), a plurality of polygons to be drawn in a same block, such as "block CP23", may be processed in different drawing processing phases. In such a case, the RPO unit 36 reads the pixel data of this block from the frame buffer FL (FB), and stores the data in the chunk buffer CB, performs a depth test, and overwrites the pixel data of a polygon which is located in this block and of which pixel data has not been generated in the chunk buffer CB.

When the chunk assignment processing is completed for all the pixels of the "polygon PG5" in FIG. 14 (YES in S19), the chunk decider unit 34 updates the flag of the "polygon PG5" of the polygon parameter buffer PB20 to "complete". Then the chunk decider unit 34 reads the parameters of the "polygon PG6" from the polygon parameter buffer PB20 (FIG. 13) (S14).

In the same manner, as for the "polygon PG6", the chunk assigner 62 assigns each block where the polygon PG6 is located to each chunk buffer respectively, such as "blocks CP24, CP25: chunk buffers CB2, CB3; blocks CP34-CP36: chunk buffer CB4-CB6; and blocks CP44, CP45: chunk buffers CB7, CB8" (S15 to S17). The RPO unit 36 generates entry numbers in the polygon parameter indication buffers IB2-IB8 which correspond to "chunk buffers CB2-CB8" respectively (S18).

Then the chunk assigner 62 attempts to assign the "block CP46" to the chunk buffer for the pixel coordinates 143 of the "polygon PG6", but the number of chunk buffers has reached 8, and there is no open chunk buffer (NO in S16). Therefore the chunk assigner 62 ends the assignment processing for the "polygon PG6", and writes coordinates (48, 32) of a block, which could not be assigned to the chunk buffer, in the entry "2" of the "polygon PG6" of the polygon parameter buffer PB20. Then the chunk decider 34 can recognize the coordinates in the middle of the assignment processing for the "polygon PG6" in the next drawing processing phase. The flag of the "polygon PG6" in the polygon parameter buffer PB20 (FIG. 13) remains "not complete".

Since assignment processing has not been performed for the "polygons PG7, PG8" (NO in S20), the chunk decider unit 34 reads the parameters of the "polygon PG7" from the polygon parameter buffer PB20 (FIG. 13) (S14). The pixels of the "polygon PG7" are included in the "block CP25" to which the "chunk buffer CB3" has already been assigned, so the RPO unit 36 writes the entry number "3" of the "polygon PG7" (PB 20 in FIG. 13) in the polygon parameter indication buffer IB3. The chunk decider unit 34 updates the flag of the "polygon PG7" in the polygon parameter buffer PB20 to "complete".

Then the chunk decider unit 34 reads the parameters of the "polygon PG8" from the polygon parameter buffer PB20 (S14), and attempts to assign the "block CP37" including the coordinates of the pixels of the "polygon PG8" to a new chunk buffer. However a number of chunk buffers already assigned has reached 8 (NO in S16), hence the chunk decider unit 34 ends the assignment processing for the "polygon PG8". Since the assignment processing has not completed for all the pixels of the "polygon PG8", the flag of the "polygon PG8" in the polygon parameter buffer PB20 remains as "not complete".

Since the assignment processing has performed for all the polygons PG5-PG8 in the polygon parameter buffer (YES in S20), the RPO unit 36 generates the pixel data for the polygons PG5-PG7 based on the polygon parameter indication buffers IB1-IB8, and writes the pixel data in the chunk buffers CB1-CB8 (S21).

The pixel data in the chunk buffer CB1-CB8 is written to the frame buffer FL (FB) (S22), and the assignment information 72 (FIG. 7) between the chunk buffers CB1-CB8 and the blocks is cleared.

<Drawing Processing in Third Phase>

At the point when the second phase ends, the "polygons PG6, PG8", having the flag "not complete", exist in the polygon parameter buffer (PB21 in FIG. 13) (YES in S23). Therefore while keeping the parameters of the polygons PG6, PG8 (entries 2, 4) in the polygon parameter buffer PB21, the polygon setup unit 31 stores the parameters of new polygons PG9, PG10 in the other entries 1, 3 (131) (S11, S12). In other words, this state is exactly the same as the polygon parameter buffer PB30 in FIG. 13.

Then the chunk decider unit 34 sequentially reads the parameters of the "polygons PG6, PG8-PG10" from the polygon parameter buffer (PB30 in FIG. 13), and assigns the blocks including the pixels of each polygon to a maximum 8 chunk buffers. When the assignment processing is performed for the "polygon PG6", the chunk position comparator 61 reads the coordinates (48, 32) stored in the polygon parameter buffer PB30, and restarts the chunk assignment processing from the pixel of these coordinates.

In this way, even in the case of a polygon which could not be assigned in the 8 (M number of) chunk buffers in the second phase, as in the case of the "polygons PG6, PG8", the graphics engine 16 according to the present embodiment keeps the parameters of this polygon in the polygon parameter buffer PB30 in the subsequent third drawing processing phase. As a consequence, the graphics engine 16 can perform drawing processing for this polygon without regenerating the drawing parameters or without reading the saved drawing parameters from an external memory in the third drawing processing phase, omitting unnecessary processing. By writing the coordinates of a polygon of which chunk assigning processing is in mid-processing, as in the case of the "polygon PG6", to the polygon parameter buffer PB with other information, the chunk decider unit 34 can restart the chunk assignment processing for the polygon in mid-processing, in the subsequent drawing processing phase.

Thus for the "polygons PG6, PG8-PG10", the blocks CP37, CP38, CP46-CP48" including each polygon, are assigned to the "chunk buffers CB1-CB5", and an entry number is written in each polygon parameter indication buffer IB1-IB5 (S15 to S20, FIG. 9). After the pixel data in the frame buffer is stored in the "chunk buffers CB1-CB5", the pixel data in the "polygons PG6-PG10" is generated and written in the "chunk buffers CB1-CB5" (S21), and is then written to the frame buffer FL (FB) (S22). In this case, all the "polygons PG8-PG10" in the polygon parameter buffer PB30 have the "complete" flag (S23), and the pixel data generation processing has completed for all the polygons (PG1-PG10) drawn in the frame buffer FL (FB) (YES in S24), hence the graphics engine 16 (FIG. 1) ends the drawing processing.

For the "polygon PG6", the chunk decider unit 34 may save the pixel data on the pixels in the boundary between the blocks not assigned to the chunk buffer CB and an assigned block (90 in FIG. 9) in the polygon parameter buffer PB20, in addition to the coordinates in mid-processing. In concrete terms, the RPO unit 36 stores the pixel data on the boundary pixels 90 between the "block CP45" and the "block CP46" in the polygon parameter buffers PB21 and PB30 when the pixel data of the "chunk buffer CB8" is generated. Due to this, when the pixel data of the "block CP46" is generated in the subsequent drawing processing phase, the RPO unit 36 can add the increment value of each image parameter to the pixel data of the boundary pixels 90, instead of the pixel data of the left edge pixel (44 in FIG. 4) of each span of the polygon, hence the pixel data can be generated even faster.

Thus the graphics engine according to the present embodiment generates pixel data on a maximum N number of polygons using a maximum M number of chunk buffers and updates pixel data in the chunk buffers. Thereby the graphics engine can generate pixel data of a polygon, not by accessing the frame buffer, except for batch accesses before and after generating the pixel data of a polygon, but by accessing the chunk buffers using fast internal memory having minimum capacity, and updating these chunk buffers. As a consequence, the graphics engine can perform drawing processing with low cost at high-speed.

The pixel data is read from the frame buffer, not in polygon units, but in chunk buffer units, and the already generated pixel data is written to the frame buffer, therefore continuous addresses of the frame buffer are accessed, and the access efficiency to the frame buffer improves.

By limiting a number of chunk buffers (M) in one drawing processing, the chunk buffer and the polygon parameter indication buffer can be constructed with small data capacity, and the capacity of the internal memory of the graphics engine can be minimized. Furthermore, by limiting a number of polygons (N) in one drawing processing, the polygon parameter buffer can also be constructed with small capacity, and the capacity of the internal memory can be minimized.

The graphics engine according to the present embodiment generates each pixel data of a quad based on the polygon parameter indication buffer. Thus by directly associating parameters of a drawing target polygon with each pixel of the quad based on the entry number of the polygon parameter indication buffer IB, the graphics engine can generate a pixel data in quad units at high-speed.

In the graphics engine according to the present embodiment, the maximum number of the polygons is N in one drawing processing, therefore a plurality of polygons to be drawn in a same block may be processed in different drawing processing phases. In this case, the graphics engine reads the pixel data of the processing target block from the frame buffer and stores the data in the chunk buffer, performs the depth test, then generates the pixel data of each polygon in this block, and updates the chunk buffers CB1-CB8. As a consequence, even if a number of polygons in one drawing processing is limited to N, the graphics engine can generate the pixel data of each polygon.

The graphics engine according to the present embodiment performs one drawing processing using a maximum M number of chunk buffers, hence some polygons may not be stored in the M number of chunk buffers. In this case, the graphics engine keeps the parameters of the polygons, of which generation of all the pixel data has not been completed, in the polygon parameter buffer of the subsequent drawing processing phase. Therefore the graphics engine can perform drawing processing of this polygon without performing a processing for newly generating the drawing parameters of this polygon and a processing for reading the saved drawing parameters from an external memory in the subsequent drawing processing phase. In other words, the graphics engine generates the drawing parameters of each polygon only once, and an increase in processing volume due to the repeat of processing for generating the drawing parameters can be avoided.

The example of the graphics engine of the present embodiment using the polygon parameter indication buffer was described, but the graphics engine need not always use the polygon parameter indication buffer. The graphics engine may sequentially generate image data from the polygon drawn at the back, and overwrites the data of the chunk buffer, in order to determine the pixel data of each pixel in the block.

The pixel data according to the present embodiment has a depth value, but the pixel data need not always have a depth value. The pixel data according to the present embodiment may have an alpha value or the like, in addition to the gradation values of the colors R, G and B.

In the above description, the external memory is assumed to be a DRAM, but the external memory is not limited to a DRAM, but may be any memory, such as a non-volatile memory. According to the present embodiment, the frequency to access the external memory is minimized, hence a drop in processing efficiency due to accessing the external memory is minimal, no matter what kind of external memory is used. Even in the case of a hierarchical external memory based on the cache system, efficient memory access with minimal generation of a cache miss can be implemented.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has been described in detail, it should be understood that the various changes, substitutions, and alterations could be made hereto without departing from the spirit and scope of the invention.

A program for making the computer execute the programs described above can be created. The program is stored in a computer-readable, non-transitory storage medium or storage unit, such as a flexible disk, a CD-ROM, a magneto-optical disk, a semiconductor memory, or a hard disk. Data in process is temporarily stored in the storage unit, such as a memory, of the computer.

What is claimed is:

1. A graphic processing apparatus which draws pixel data of a plurality of polygons in a frame buffer having a plurality of blocks being divided, comprising:
    a plurality of chunk buffers each configured to being same size as the block;
    a chunk assignment unit configured to perform assigning the blocks, in which a target polygon being processed is located, to the plurality of chunk buffers sequentially, until the number of assigned chunk buffers reaches M units, a shape of the plurality of assigned blocks becomes non-rectangular in accordance with the target polygon when the target polygon is located in the plurality of adjacent blocks;
    a chunk generation unit configured to generate pixel data of the target polygons, the pixel data being located in the blocks assigned to the plurality of chunk buffers, and writes the pixel data to the plurality of chunk buffers; and
    a chunk writing unit configured to write the pixel data written in the plurality of chunk buffers to the frame buffer, wherein
    a processing phase, including processing of the assigning by the chunk assignment unit, processing of generating and writing pixel data by the chunk generation unit, and processing of writing pixel data to the frame buffer by the chunk writing unit, is repeatedly executed for the plurality of polygons.

2. The graphic processing apparatus according to claim 1, wherein
    the chunk generation unit reads the pixel data of the block assigned to the plurality of chunk buffers from the frame buffer, and writes the pixel data to the plurality of chunk buffers in each processing phase, and writes the generated pixel data to the plurality of chunk buffers where the read pixel data have been written.

3. The graphic processing apparatus according to claim 2, wherein
    the graphic processing apparatus further comprises a polygon parameter buffer generation unit which generates drawing parameters based on vertex data of the polygons, and writes the drawing parameters to the polygon parameter buffer in each processing phase, and
    the chunk generation unit generates pixel data of the polygons based on the drawing parameters of the polygon parameter buffer.

4. The graphic processing apparatus according to claim 3, wherein
    in a first processing phase, the polygon parameter buffer generation unit keeps the drawing parameters of a polygon for which the generation of the pixel data is not completed, out of the drawing parameters of the polygons written in the polygon parameter buffer, in the polygon parameter buffer in the second processing phase which comes after the first processing phase, and the polygon parameter buffer generation unit generates drawing parameters of the polygons, along with the polygon of which drawing parameters have been kept, and writes the drawing parameters in the polygon parameter buffer.

5. The graphic processing apparatus according to claim 3, wherein
    the pixel data further has a depth value which indicates depth, and
    when the depth value of the generated pixel data is smaller than a depth value of a corresponding pixel of the pixel data read from the frame buffer, the chunk generation unit writes the generated pixel data to the plurality of chunk buffers.

6. The graphic processing apparatus according to claim 5, wherein
    the drawing parameters of the polygon parameter buffer are stored in association with the identification information, and
    the chunk generation unit stores, for each pixel of the block, the identification information in the polygon parameter buffer associated with a polygon having the smallest depth value, out of the polygons located in the block, to the polygon parameter indication buffer, and generates pixel data of the polygons by referring to the drawing parameters based on the identification information in the polygon parameter indication buffer.

7. The graphic processing apparatus according to claim 4, wherein
    for a polygon of which generation of the pixel data is not completed, the chunk assignment unit writes coordinate information, which indicates a pixel for which this generation is not completed, to the polygon parameter buffer in the first phase, and
    for the polygon for which generation of the pixel data is not completed, the chunk assignment unit assigns the block, where the pixel indicated by the coordinate information in the polygon parameter buffer is located, to the chunk buffer in the second phase.

8. The graphic processing apparatus according to claim 1, wherein
    an access speed is faster in the chunk buffer than in the frame buffer.

9. The graphic processing apparatus according to claim 3, wherein
    an access speed is faster in the polygon parameter buffer than in the frame buffer.

10. A non-transitory computer-readable medium storing a graphic processing program for draw pixel data of a plurality of polygons in a frame buffer having a plurality of blocks being divided, the program causes a computer repeatedly to execute a process comprising:
    a chunk assigning which performs assigning the blocks, in which a target polygon being processed is located, to a plurality of chunk buffers sequentially, until the number of assigned chunk buffers reaches M units, a shape of the plurality of assigned blocks becomes non-rectangular in accordance with the target polygon when the target polygon is located in the plurality of adjacent blocks;
    a chunk generating which generates pixel data of the target polygons, the pixel data being located in the blocks assigned to the plurality of chunk buffers, and writes the pixel data to the plurality of chunk buffers; and
    a chunk writing which writes the pixel data written in the plurality of chunk buffers to the frame buffer.

11. The graphic processing program according to claim 10, wherein
    the chunk generating includes reading the pixel data of the block assigned to the plurality of chunk buffers from the frame buffer, writing the pixel data to the plurality of chunk buffers in each processing phase, and writing the generated pixel data to the plurality of chunk buffers where the read pixel data have been written.

12. The graphic processing program according to claim 11, further comprising a polygon parameter buffer generating drawing parameters based on vertex data of the polygons and writing the drawing parameters to the polygon parameter buffer in each processing phase, wherein
    the chunk generating includes generating pixel data of the polygons based on the drawing parameters of the polygon parameter buffer.

13. The graphic processing program according to claim 12, wherein
    in a first processing phase, the polygon parameter buffer generating includes keeping the drawing parameters of a polygon for which generation of the pixel data is not completed, out of the drawing parameters of the polygons written in the polygon parameter buffer in a second processing phase which comes after the first processing phase, and the polygon parameter buffer generating includes generating drawing parameters of the polygons, along with the polygon of which drawing parameters have been kept, and writing the drawing parameters in the polygon parameter buffer.

14. The graphic processing program according to claim 13, wherein
    for a polygon for which generation of the pixel data is not completed, the chunk assigning includes writing coordinate information, which indicates a pixel of which this generation is not completed, to the polygon parameter buffer in the first phase, and
    for the polygon of which generation of the pixel data is not completed, the chunk assigning includes assigning the block, where the pixel indicated by the coordinate information in the polygon parameter buffer is located, to the chunk buffer in the second phase.

15. The graphic processing apparatus according to claim 1, wherein
    the chunk assignment unit repeats the assigning until the number of the target polygons reaches N units.

16. The graphic processing apparatus according to claim 1, wherein
    the chunk assignment unit detects the coordinate in the frame buffer which the target polygon is drawn sequentially, and assigns the block which corresponding to the coordinate, to the chunk buffer.

17. The graphic processing apparatus according to claim 1, wherein
    the chunk assigning repeats the assigning until the number of the target polygons reaches N units.

18. The graphic processing apparatus according to claim 1, wherein
    the chunk assigning detects the coordinate in the frame buffer which the target polygon is drawn sequentially, and assigns the block which corresponding to the coordinate, to the chunk buffer.

\* \* \* \* \*